(12) United States Patent
Neul

(10) Patent No.: US 8,375,786 B2
(45) Date of Patent: Feb. 19, 2013

(54) ROTATION RATE SENSOR HAVING A QUADRATURE COMPENSATION PATTERN

(75) Inventor: Reinhard Neul, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 107 days.

(21) Appl. No.: 12/308,533

(22) PCT Filed: Aug. 24, 2007

(86) PCT No.: PCT/EP2007/058820
§ 371 (c)(1),
(2), (4) Date: Sep. 14, 2010

(87) PCT Pub. No.: WO2008/049663
PCT Pub. Date: May 2, 2008

(65) Prior Publication Data
US 2011/0126621 A1    Jun. 2, 2011

(30) Foreign Application Priority Data
Oct. 23, 2006   (DE) .......................... 10 2006 049 887

(51) Int. Cl.
*G01C 19/56* (2006.01)
(52) U.S. Cl. .................................. 73/504.12; 73/504.14
(58) Field of Classification Search ............... 73/504.12, 73/504.14, 504.15, 504.16, 504.04, 504.02
See application file for complete search history.

(56) References Cited

U.S. PATENT DOCUMENTS

| | | | |
|---|---|---|---|
| 6,250,156 B1 | 6/2001 | Seshia et al. | |
| 6,705,164 B2 * | 3/2004 | Willig et al. | 73/504.12 |
| 7,051,590 B1 | 5/2006 | Lemkin et al. | |
| 7,313,958 B2 * | 1/2008 | Willig et al. | 73/504.12 |
| 7,316,161 B2 * | 1/2008 | Willig et al. | 73/504.12 |
| 2004/0123660 A1 * | 7/2004 | Willig et al. | 73/504.12 |
| 2004/0154398 A1 | 8/2004 | Willeg et al. | |
| 2004/0206176 A1 * | 10/2004 | Willig et al. | 73/504.12 |
| 2006/0037396 A1 * | 2/2006 | Nicu et al. | 73/504.12 |
| 2007/0234803 A1 * | 10/2007 | Gomez et al. | 73/504.12 |
| 2011/0041603 A1 * | 2/2011 | Pruetz | 73/504.12 |
| 2011/0083507 A1 * | 4/2011 | Geckeler et al. | 73/504.12 |

FOREIGN PATENT DOCUMENTS

| | | |
|---|---|---|
| DE | 10237411 | 7/2003 |
| DE | 10203515 | 8/2003 |
| DE | 10237410 | 8/2003 |
| JP | 9178494 | 7/1997 |
| JP | 2000-28366 | 1/2000 |
| JP | 2004-233088 | 8/2004 |
| JP | 2005-514608 | 5/2005 |
| JP | 2005-514609 | 5/2005 |
| JP | 2005-516207 | 6/2005 |

OTHER PUBLICATIONS

International Search Report, PCT International Patent Application No. PCT/EP2007/058820, dated Nov. 30, 2007.

* cited by examiner

*Primary Examiner* — Helen C. Kwok
(74) *Attorney, Agent, or Firm* — Kenyon & Kenyon LLP

(57) ABSTRACT

A rotation-rate sensor having at least one quadrature compensation pattern, which includes at least one first electrode and one second electrode. The second electrode has a first electrode surface and a second electrode surface which are situated opposite to each other. The first electrode is situated in an intermediate space, between the first electrode surface and the second electrode surface. The first electrode surface and also the second electrode surface, over their extension, are at a different distance from the first electrode. The first electrode surface and the second electrode surface of the second electrode are at generally the same distance from each other, over their extension.

5 Claims, 3 Drawing Sheets

ROTATION RATE SENSOR HAVING A QUADRATURE COMPENSATION PATTERN

FIELD OF THE INVENTION

The present invention relates to a rotation-rate sensor having at least one quadrature compensation pattern, which includes at least one first electrode and one second electrode. The second electrode has a first electrode surface and a second electrode surface which are situated opposite to each other, in this context. The first electrode is situated in an intermediate space between the first electrode surface and the second electrode surface. The first electrode surface or even the second electrode surface, over their extension, have a different distance from the first electrode.

BACKGROUND INFORMATION

During operation, rotation-rate sensors have a drive vibration, in order to detect a deflection when a rotational motion occurs as a result of a Coriolis force. As a result of manufacturing tolerances, cross feed of the drive motion to the detection motion of the sensor patterns may occur in micromechanical rotation-rate sensors. For this reason, so-called quadrature compensation patterns are provided, to compensate for this cross feed, and thus to raise the performance of the sensors, especially the resolution, and to reduce the signal noise. In German Patent Application No. DE-10237411 A1, quadrature compensation patterns are described which mediate a dynamic force effect as a result of their geometrical design. Other rotation-rate sensor patterns, such as the so-called compact patterns, which are described in German Patent Application No. DE-10203515 A1, may be improved by a quadrature compensation. One disadvantage of the related art is the fact that the quadrature compensation forces exert a resulting torque on the Coriolis frame about the z axis since, based on the various positions of the micromechanical patterns on the substrate, a lever arm occurs, and with that, a torque about the z axis, perpendicular to the substrate surface.

SUMMARY

The present invention relates to a rotation-rate sensor having at least one quadrature compensation pattern, which includes at least one first electrode and one second electrode. The second electrode has a first electrode surface and a second electrode surface which are situated opposite to each other, in this context. The first electrode is situated in an intermediate space between the first electrode surface and the second electrode surface. The first electrode surface or even the second electrode surface, over their extension, have a different distance from the first electrode. The first electrode surface and the second electrode surface of the second electrode, over its extension, are at generally the same distance from each other.

The example quadrature compensation pattern according to the present invention is advantageously suitable for quadrature compensation (resulting in forces $f_{a,b,c}$). In addition, it also has two further advantages. The example quadrature compensation pattern according to the present invention does not generate a resulting torque at the compensated micromechanical pattern. The example quadrature compensation pattern according to the present invention requires less surface on a substrate, at the same performance, compared to the related art. The saving in surface may amount up to 50%, in this context.

It may be advantageous if the first electrode is designed generally plate-shaped. One advantageous embodiment of the present invention provides that the second electrode encloses the first electrode in an annular shape or a U shape. One particularly advantageous embodiment provides that the rotation-rate sensor have a plurality of quadrature compensation patterns situated adjacently side by side.

DETAILED DESCRIPTION OF EXEMPLARY EMBODIMENTS

The related art as well as exemplary embodiments of the present invention are shown in the figures and are described below.

Figure 1:
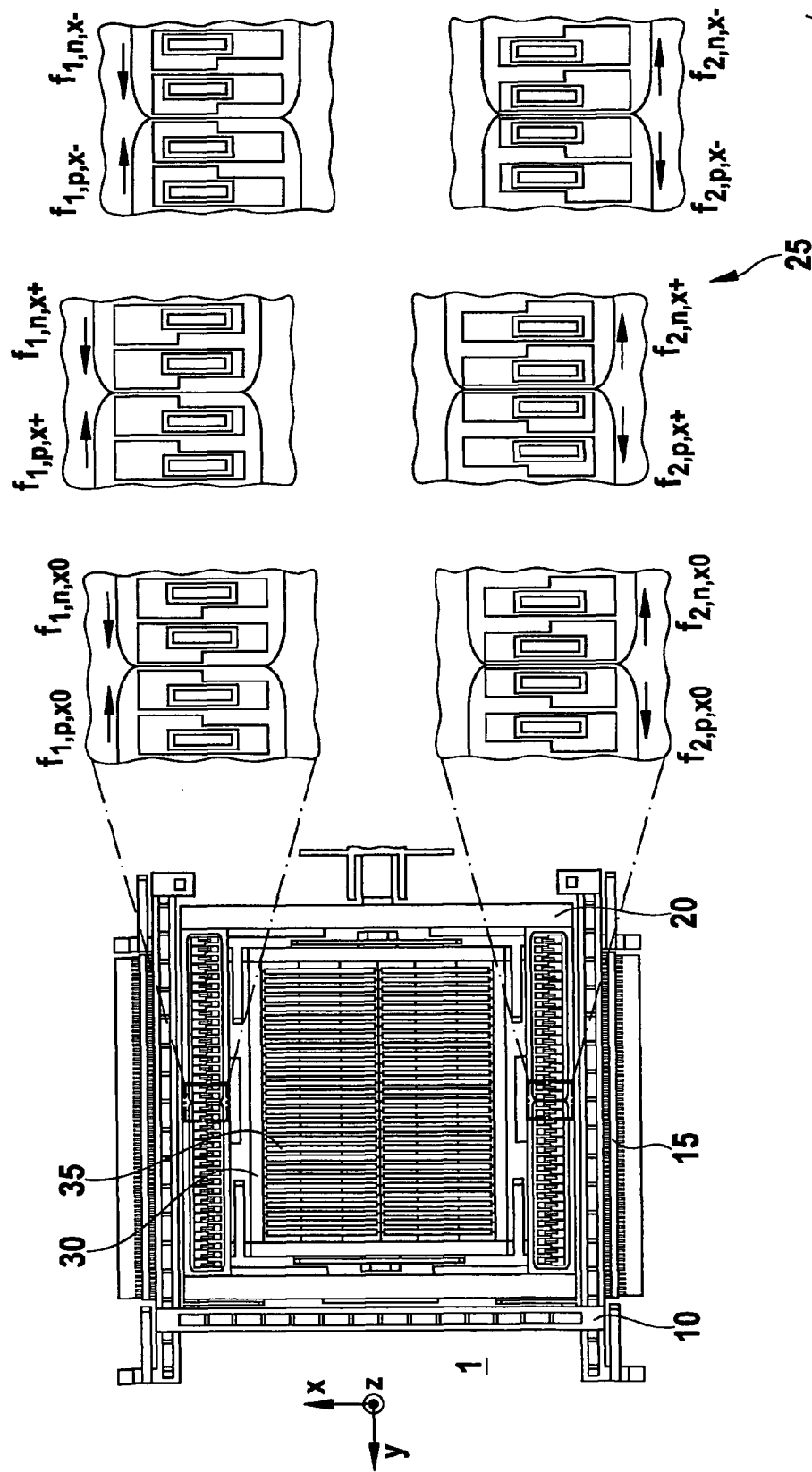
FIG. 1 shows a rotation-rate sensor having conventional quadrature compensation patterns.

FIG. 1 shows a conventional rotation-rate sensor having quadrature compensation patterns as described in German Patent Application No. DE 10237411 A1. What is shown is one-half of a micromechanical pattern of a rotation-rate sensor. What is shown is a drive frame 10 having drive vibration patterns 15, a Coriolis frame 20 situated in it having quadrature compensation patterns 25 and a detection frame 30 situated in it that has detection electrodes 35. Drive frame 10 is suspended on substrate 1, situated below it, with springs, using an anchoring arrangement in such a way that the driving mass can preferably execute only one in-plane motion (parallel to the plane of the substrate) in a first direction, or rather, according to a first axis (the x axis), and an in-plane motion in a second axis (the y axis), which is perpendicular to the first axis, is suppressed. The first axis is also called driving axis X; the second axis is also called detection axis Y. Detection frame 30 is suspended with respect to substrate 1, using springs, in such a way that it preferably is able to perform an in-plane motion only in detection direction y, and a motion in driving direction x is suppressed. Coriolis frame 20 is connected to drive frame 10 and detection frame 30, using springs, in such a way that the Coriolis element is able to perform an in-plane relative motion with respect to the driving mass preferably only in the detection direction, and a relative motion in the drive direction is suppressed, and that the Coriolis element is able to perform an in-plane relative motion with respect to the detection element preferably only in the x direction, and a relative motion in the y direction is suppressed, in such a way that the Coriolis element is able to perform a motion both in the drive direction and in the detection direction.

In the lay-out of the rotation-rate sensor, by design (choice of suitable symmetries) a singular cartesian coordinate system, $K=(x,y)$ is specified for the primary and the secondary vibration within the plane of the substrate. The mass distributions and the spring distributions should ideally be laid out so that the main axis system of the mass tensors and spring stiffness tensors for the primary and secondary vibrations coincide exactly with K.

In addition, in the implementation of the detector, care is taken that no signals are created at the detector for the Coriolis effect by the operation of the sensors in the primary vibration (without external rotation rate), the drive vibration in the x direction. For this purpose, the detector is designed so that its singular coordinate system KD also coincides with the coordinate system of the mechanics K, i.e., it is also true that KD=(x,y).

When the coordinate systems K and KD do not completely coincide, for instance, because of manufacturing fluctuations, quadrature signals may appear.

There is a difference made between positive and negative quadrature signals, with respect to the Coriolis measuring effect: when the left partial pattern of the rotation-rate sensor shown moves in the primary vibration in the positive x direction, and a positive external rotation rate about the z axis, the Coriolis acceleration acts in the positive y direction. A positive quadrature signal acts in the same direction, and a negative quadrature signal acts in the opposite direction.

In this rotation-rate sensor of the related art, (dynamic) electrostatic forces that are variable in time—possibly superposed by forces constant in time (static)—are exerted on the sensor pattern, due to electrode patterns in the form of quadrature compensation patterns 25, that are mounted on Coriolis frame 20, by the specified application of external electrical DC voltages. It is achieved by the suitable application of these quadrature compensation patterns 25 that, during the primary vibration of the sensor pattern, forces varying in time act upon suitable parts within the sensor pattern. These forces are oriented in such a way that they excite secondary vibrations, and may consequently be detected at the detector of the Coriolis effect. Because of the height of the electrical voltage, the magnitude of these signals may be set in such a way that they compensate the quadrature signals present in the sensor element because of imperfections of the sensor pattern.

Dynamic quadrature compensation patterns 25 are shown in the two enlarged segments of FIG. 1. The compensation patterns are provided in the form of two subpatterns, one first subpattern compensating for the positive quadrature signals, and a second subpattern compensating for the negative quadrature signals. Such two subpatterns are selected because in that way, by exerting electrostatic forces, particularly forces of attraction, a rotation of coordinate system K is able to be effected both in the positive and in the negative direction. FIG. 1 describes in a more detailed fashion the function of the quadrature compensation. As a function of the deflection of the Coriolis frame in the x direction, variably strong electrostatic forces come about ($f_{a,b,c}$ with position on the chip a={1,2}, positive and negative quadrature compensation b={p,n} and deflection in the x direction c={x−, x0, x+}). A quadrature error may be removed using these by applying a certain voltage to the positive quadrature compensation electrodes (resulting in forces $f_{a,p,c}$) or to the negative quadrature compensation electrodes (resulting in forces $f_{a,n,c}$). One disadvantage of the related art is the fact that the quadrature compensation forces exert a resulting torque on the Coriolis frame about the z axis, since the forces $f_{1,b,c}$ have different direction and absolute quantity, compared to forces $f_{1,b,c}$), and thus, based on the various positions of the patterns on the chip, a lever arm occurs, and with that, a torque about the z axis.

Figure 2:
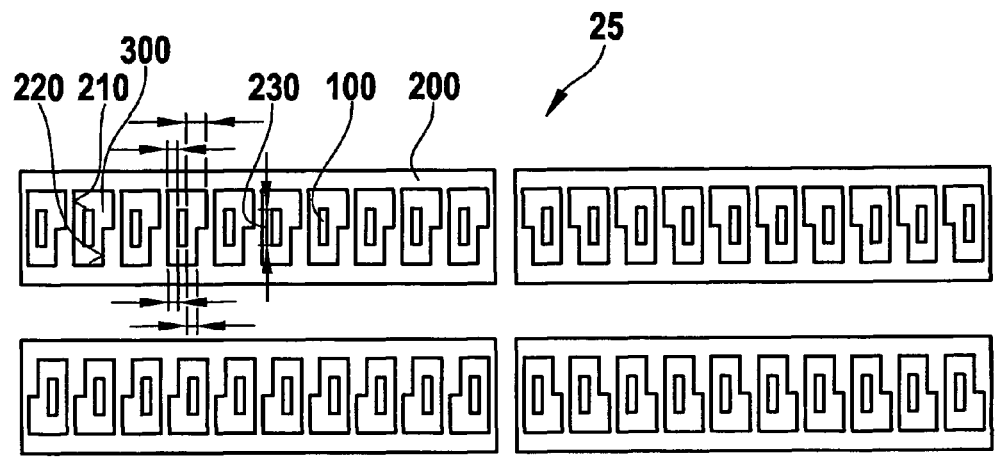
FIG. 2 shows the conventional quadrature compensation patterns.

FIG. 2 shows the quadrature compensation patterns of the related art in detail. Quadrature compensation patterns 25 include a first electrode 100 and a second electrode 200. Second electrode 200 has a first electrode surface 210 and a second electrode surface 220 which are situated opposite to each other.

First electrode 100 is situated in an intermediate space 300, between the first and the second electrode surface 210, 220. First electrode 100 is developed as a plate having a rectangular base area and a constant thickness. It is anchored to a subjacent substrate (not shown) and extends upwards perpendicular to the substrate surface. A second electrode 200 is formed from parts of the Coriolis frame, which is situated above the substrate. Second electrode 200 encloses first electrode 100. First electrode surface 210 of second electrode 200, in the example described here, is at a constant distance from opposite first electrode 100 over its extension 230. The distance is as seen perpendicular to the electrode surfaces of first electrode 100, which are situated opposite electrode surfaces 210 and 220 of second electrode 200. Second electrode surface 220 of second electrode 200 has a step, and consequently has a different distance from opposite first electrode 100 over extension 230. As a result of the step in second electrode surface 220, the distance takes on two different values. As a result of this step in second electrode surface 220, first and second electrode surface 210, 220 of second electrode 200 also have a different distance from each other over extension 230. This distance also assumes two different values. The pattern described here is repeated in a fashion mounted side by side in order to provide more electrode surfaces and thus be able to exert greater forces. For this purpose, second electrode 200 is provided with a plurality of enclosed intermediate spaces 300, which in each case have a first and second electrode surface 210, 220. A further first electrode surface 100 is situated in each case in intermediate spaces 300.

Figure 3:
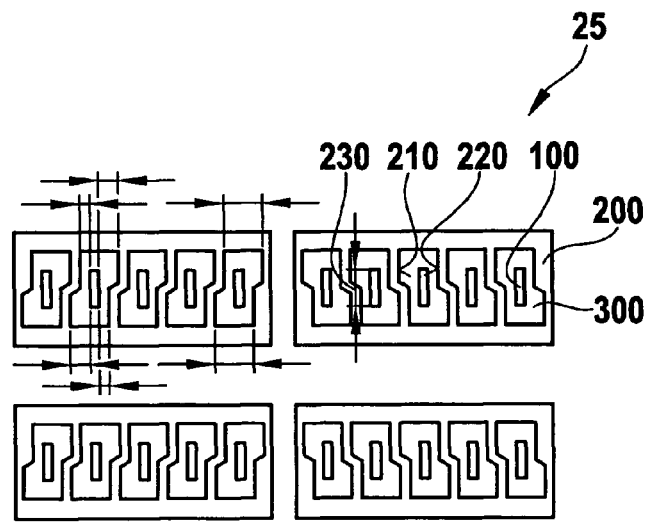
FIG. 3 shows a first specific embodiment of quadrature compensation patterns according to the present invention.

FIG. 3 shows a first specific embodiment of quadrature compensation patterns according to the present invention, The quadrature compensation patterns in the related art may be replaced, at equal or even improved effectiveness, by the quadrature compensation patterns according to the present invention shown here. The example quadrature compensation patterns according to the present invention, compared to the related art, additionally have the advantages of freedom from torque with respect to the z axis, and a lower area requirement. In this context, FIG. 3 shows the new patterns on the same scale as in FIG. 2, at the same effectiveness. One is thus able to recognize the possible savings in area of close to 50%. At the same time, one is able to recognize that the new patterns, without deflection in the x direction, that is, in the x0 position or rest position, do not exert any resultant forces on the Coriolis frame, and that, in response to the deflection in the x+ or the x− direction, the resultant forces have the same absolute quantity and the same direction. This creates no torque about the z axis.

The example quadrature compensation patterns according to the present invention are designed as follows. First electrode surface 210 has a step, same as second electrode surface 220 of second electrode 200. Thus, each of the two electrode surfaces 210, 220 is at a different distance from opposite first electrode 100 over its extension 230. As a result of the step in first and second electrode surface 210, 220, the distance takes on two different values. As a result of this step which is provided in the same manner in first electrode surface 210 and opposite to that in second electrode surface 220, first and second electrode surfaces 210, 220 of second electrode 200 are at a generally equal distance from each other. The distance with respect to first electrode 100 also assumes two different values. The pattern described here is repeated in a fashion mounted side by side in order to provide more electrode surfaces and thus be able to exert greater forces. For this purpose, second electrode 200 is provided with a plurality of enclosed intermediate spaces 300, which in each case have a first and second electrode surface 210, 220. A further first electrode surface 100 is situated in each case in intermediate spaces 300. However, in deviation from the related art, the wall thickness of first and second electrode surface 210, 220 are provided to be uniformly thin. Quadrature compensation patterns 25 are thus able to be situated closer to one another, that is, packed more densely. From this one obtains the area savings mentioned above.

Figure 4A:
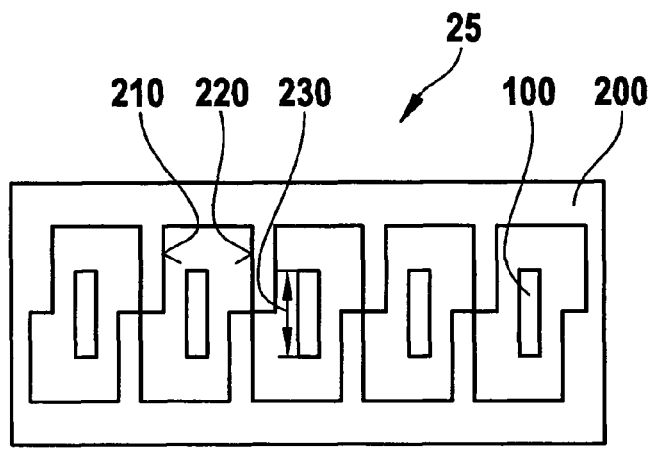
FIGS. 4 A, B, C show three other specific embodiments of quadrature compensation patterns according to the present invention.
Figure 4B:
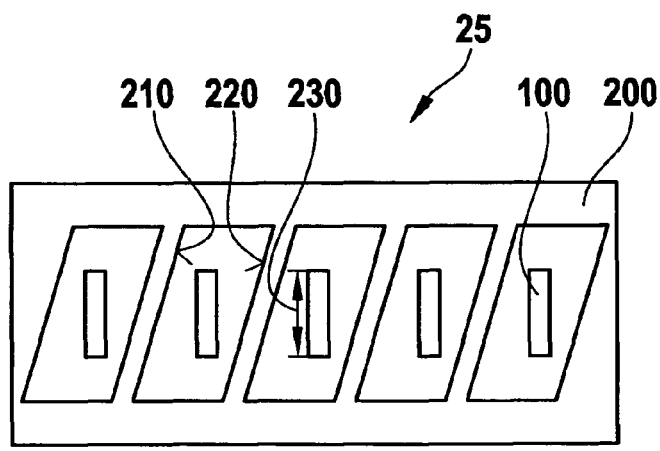
Figure 4C:
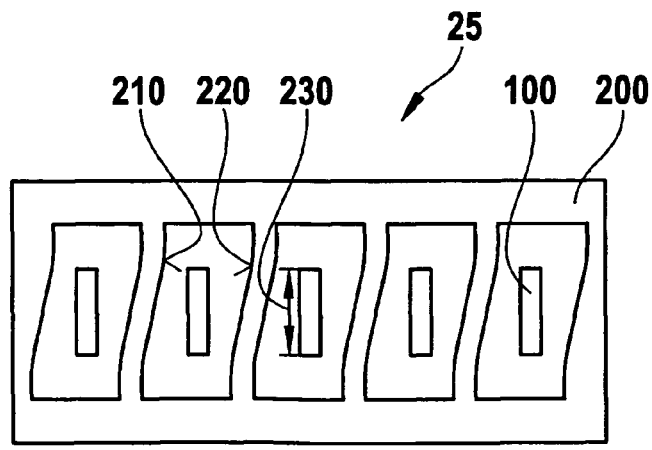

FIGS. 4 A, B, C show three other specific embodiments of quadrature compensation patterns according to the present invention. The respectively associated mirrored counterpart, as is still shown in FIG. 3, is not shown in this context. What is common to all specific embodiments is the feature that first and second electrode surfaces 210, 220 of second electrode 200 are at a generally equal distance with respect to each other. They run basically parallel to each other. In the specific embodiment as in FIG. 4 A, first and second electrode surface 210, 220, have a step that is in each case exactly opposite, and furthermore they do not only run parallel to each other but also parallel to first electrode 100. The respective distance of first and second electrode surface 210, 220 from first electrode 100 changes discontinuously over extension 230 of the electrode surface and abruptly at the step. In the specific embodiment according to FIG. 4 B, first and second electrode surface 210, 220 have no step. They run in parallel to each other, but in each case not in parallel to first electrode 100. The respective distance of first and second electrode surface 210, 220 from first electrode 100 changes constantly and uniformly over extension 230 of the electrode surface. The specific embodiment according to FIG. 4 C represents a mixed form of the specific embodiments according to FIGS. 4 A and B. The respective distance of first and second electrode surface 210, 220 from first electrode 100 changes steadily but not uniformly over extension 230 of the electrode surface.

In this context, the variant according to FIG. 4 C enables one to specify the course of the quadrature compensation force as a function of the deflection of the pattern in the x direction, by the shaping of electrodes 100, 200 (and possibly also by the shaping of first electrode 100 that is fixed to the substrate).

What is claimed is:

1. A rotation-rate sensor having at least one quadrature compensation pattern, which includes at least one first electrode and one second electrode, the second electrode having a first electrode surface and a second electrode surface which are situated opposite to each other, the first electrode being situated in an intermediate space between the first electrode surface and the second electrode surface, at least one of the first electrode surface and the second electrode surface being at a variable distance from the first electrode over an entire extension of the first electrode, wherein the first electrode surface and the second electrode surface of the second electrode are at an equal distance from each other over the entire extension of the first electrode.

2. The rotation-rate sensor as recited in claim 1, wherein the first electrode is plate-shaped.

3. The rotation-rate sensor as recited in claim 1, wherein the second electrode encloses the first electrode one of (a) annularly or (b) in a U-shaped manner.

4. The rotation-rate sensor as recited in claim 1, wherein the rotation-rate sensor has a plurality of quadrature compensation patterns that are arranged side by side.

5. The rotation-rate sensor as recited in claim 1, wherein the first electrode surface and the second electrode surface each have wall thicknesses of uniform thickness.

* * * * *

UNITED STATES PATENT AND TRADEMARK OFFICE
CERTIFICATE OF CORRECTION

PATENT NO.       : 8,375,786 B2
APPLICATION NO. : 12/308533
DATED            : February 19, 2013
INVENTOR(S)      : Reinhard Neul It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 792 days.

Signed and Sealed this
First Day of September, 2015

Michelle K. Lee
*Director of the United States Patent and Trademark Office*